US007543002B2

(12) United States Patent
Ghattu et al.

(10) Patent No.: US 7,543,002 B2
(45) Date of Patent: Jun. 2, 2009

(54) MECHANISM TO LOAD FIRST VERSION CLASSES INTO A RUNTIME ENVIRONMENT RUNNING A SECOND VERSION OF THE CLASS

(75) Inventors: Satya Srinivas Ghattu, Tewksbury, MA (US); Franklin Fulton Simpson, New Ipswich, NH (US)

(73) Assignee: BEA Systems, Inc., San Jose, CA (US)

( * ) Notice: Subject to any disclaimer, the term of this patent is extended or adjusted under 35 U.S.C. 154(b) by 424 days.

(21) Appl. No.: 11/037,482

(22) Filed: Jan. 18, 2005

(65) Prior Publication Data

US 2006/0123067 A1 Jun. 8, 2006

Related U.S. Application Data

(60) Provisional application No. 60/632,635, filed on Dec. 2, 2004.

(51) Int. Cl.
*G06F 7/04* (2006.01)
*G06F 17/30* (2006.01)

(52) U.S. Cl. .......................................... 707/203; 707/8

(58) Field of Classification Search ................. 707/203, 707/8
See application file for complete search history.

(56) References Cited

U.S. PATENT DOCUMENTS

| 6,272,521 B1 * | 8/2001 | Jablonski et al. ............. 709/200 |
| 6,298,353 B1 * | 10/2001 | Apte ...................... 707/103 R |
| 6,477,701 B1 * | 11/2002 | Heistermann et al. ....... 717/108 |
| 2003/0005169 A1 * | 1/2003 | Perks et al. ................. 709/315 |
| 2004/0055005 A1 * | 3/2004 | Creswell et al. ............. 719/315 |
| 2004/0230948 A1 * | 11/2004 | Talwar et al. ................ 717/114 |

* cited by examiner

*Primary Examiner*—John E Breene
*Assistant Examiner*—Patrick E Sweeney
(74) *Attorney, Agent, or Firm*—Fliesler Meyer LLP

(57) ABSTRACT

Mechanisms and methods for loading a first version of a class into a second version runtime environment running a second version of the class. The runtime environment may be comprised of a Java Virtual Machine (JYM). These mechanisms and methods make it possible for applications to retrieve and convert legacy data into current versions of the runtime environment. The conversion of data may be done automatically and/or transparently to a user or calling process.

29 Claims, 4 Drawing Sheets

US 7,543,002 B2

MECHANISM TO LOAD FIRST VERSION CLASSES INTO A RUNTIME ENVIRONMENT RUNNING A SECOND VERSION OF THE CLASS

CLAIM OF PRIORITY

The present application claims the benefit of priority under 35 U.S.C. §119(e) to U.S. Provisional Patent Application entitled "MECHANISM TO LOAD FIRST VERSION CLASSES INTO A RUNTIME ENVIRONMENT RUNNING A SECOND VERSION OF THE CLASS", Application No. 60/632,635, filed on Dec. 02, 2004, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to maintaining compatibility across software versions, and more particularly to a mechanism for loading a first version of a class into a second version runtime environment running a second version of the class.

BACKGROUND

Typically, software is released in successive versions. Each successive version makes changes that either correct errors in previous versions or add additional functionality. One area of concern in versioning software is maintaining compatibility with prior versions. For example, if a previous version has been released with a particular class definition, a successive version with a different definition of that class can incur difficulties in loading data defined using the previous version.

In a specific example, if a user defines a Java class that is serializable, but does not define a Serial Version ID, this class cannot be loaded in the next version of the Java Virtual Machine (JVM) if the class has been changed between the JVM versions. One possible approach to solving this problem would be to change the source class to declare the serial version identifier.

This solution would not be available, however, in situations where a portion of the software, such as a class definition, for example, has been exposed to the user to permit user modification of the class. In such cases, the developer may confront incompatibility issues if a later version attempts to modify the class. In one typical scenario, the developer would write a first version. Another party modifies the first version to make a second version. During loading, for example, the loader finds the second version instead of first version and raises an exception.

Practically speaking, the developer may not have access to classes previously released and then modified, eliminating reversioning of such classes as an option. If the developer is no longer able to access the code, the developer could not change the first version class. Instead, the developer would need to work with the second version.

However, none of these approaches enables working with data stored according to previously used versions of classes.

SUMMARY

In accordance with one embodiment of the present invention, there are provided mechanisms and methods for loading a first version of a class into a second version runtime environment running a second version of the class. The runtime environment may be comprised of a Java Virtual Machine (JVM) in some embodiments. These mechanisms and methods make it possible for applications to retrieve and convert legacy data into current versions of the runtime environment. In one embodiment, the conversion of data may be done automatically and/or transparently to a user or calling process.

In one embodiment, a new class loader is defined and a first version of a class is added to the loader's classpath, so that this class loader can load this version of the class without a version conflict. A utility class is defined to serve as an intermediary class so that the data represented by the first version class may be converted into a known object (i.e., the utility class). In specific embodiments, the intermediary class can be, without limitation, a string, an XML object, a hashmap, a Java object, and other objects are contemplated. Then, this object is returned to the caller.

The mechanisms and methods for loading a first version of a class into a second version runtime environment running a second version of the class enable applications to retrieve and convert legacy data for use with current versions of the runtime environment. This ability to retrieve and convert legacy data for use with current versions of the runtime environment makes it possible to attain improved usage from computing resources that are used in conjunction with runtime environments in a computer system.

DETAILED DESCRIPTION

In accordance with one embodiment of the present invention, there are provided mechanisms and methods for loading a first version of a class into a second version runtime environment running a second version of the class. The runtime environment may be comprised of a Java Virtual Machine (JVM) in some embodiments. These mechanisms and methods make it possible for applications to retrieve and convert legacy data for use with current versions of the runtime environment. In one embodiment, the conversion of data may be done automatically and/or transparently to a user or calling process.

In one embodiment, information according to a first version class may be automatically converted into an intermediate storage format for use with a second version runtime environment. Automatic conversion into an intermediate storage format includes selecting an appropriate intermediate storage format for the information for use with the second version runtime environment based upon the first version class. For example, embodiments include one or more of selecting a hashmap as intermediate storage format for the information if the first version class comprises name/value pairings; selecting an eXtended Markup Language (XML) object as intermediate storage format for the information if the first version class comprises metadata; and selecting a string object as intermediate storage format for the information if the first version class comprises a long string data, and other storage format—first version class format pairings are contemplated.

Figure 1:
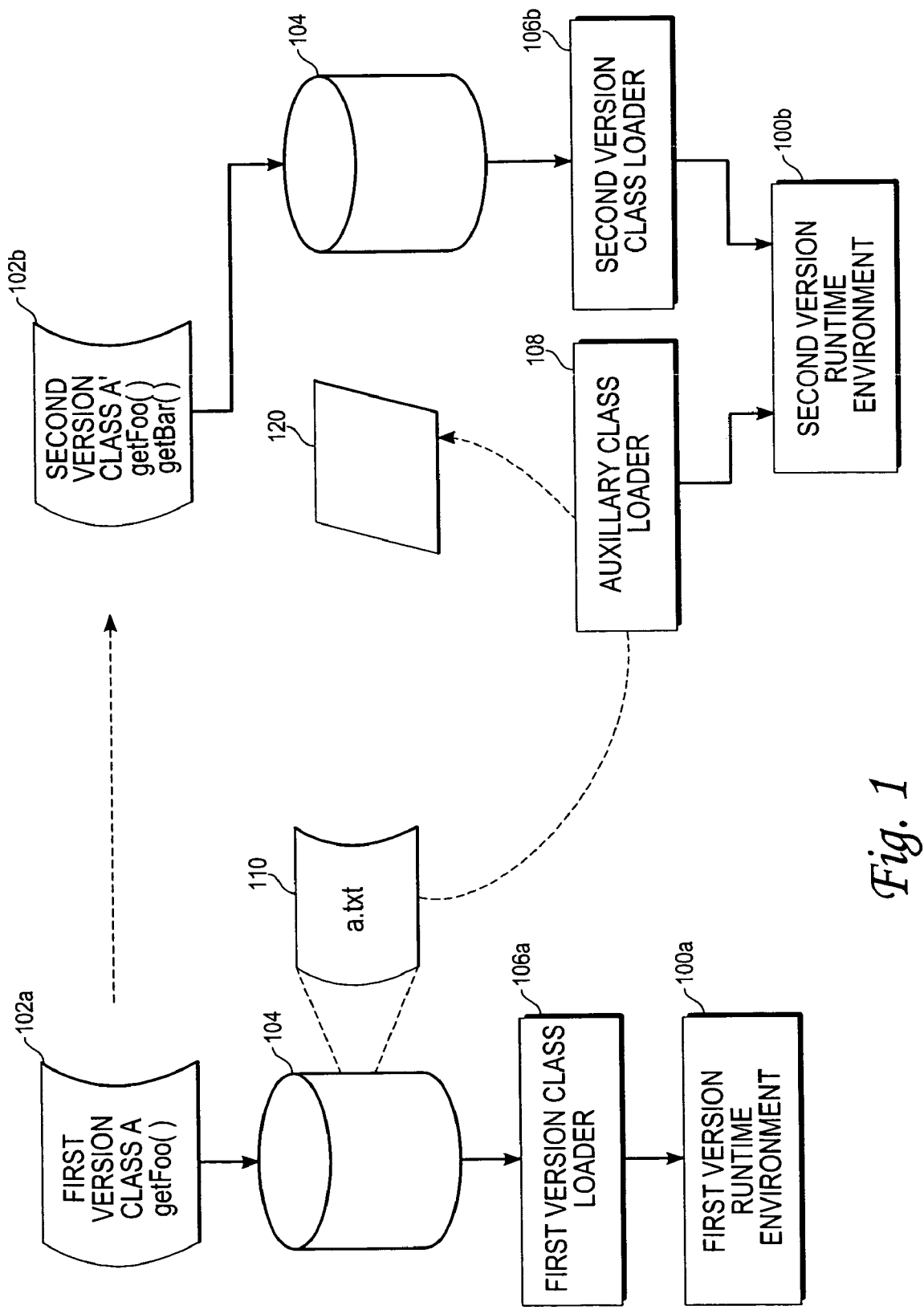
FIG. 1 is a functional block diagram of an example computing environment in which loading a first version of a class into a second version runtime environment running a second version of the class may be implemented in one embodiment of the present invention.

FIG. 1 is a functional block diagram of an example computing environment in which loading a first version of a class into a second version runtime environment running a second version of the class may be implemented in one embodiment of the present invention. While the invention is illustrated generally with reference to an example of devices using a Java Virtual Machine (JVM) as the runtime environment, the present invention does not require such an environment, and in some embodiments, techniques according to the invention may be implemented in devices using alternative runtime environments.

As shown in FIG. 1, a user defines a first version of a class A 102*a* in a first version runtime environment 100*a*, such as JVM version 1.0, for example, which implements serializable objects. The user defines a method, getFoo( ), as part of the first version class 102*a*. The user serializes the class to form "a.txt" 110, a data entity that may reside in a semi-permanent storage medium 104, which may be a Direct Access Storage Device (DASD) storing a a.txt 110 as a file, a database storing a.txt in tables or other storage mechanism using other forms of data storage are contemplated. The user may then load the serializable object from "a.txt" 110 into the first runtime environment 100*a* using a first version class loader 106*a*.

In a second version of the runtime environment 100*b*, such as JVM version 2.0, for example, the user adds another method getBar( ) to form a second version class A' 102*b*. The second version class A' 102*b* may be stored on the same semi-permanent storage medium 104 in one embodiment, or in another location and/or in a different format in other embodiments. If the user attempts to load the data stored in "a.txt" from storage medium 104, using for example, a second version class loader 106*b* that accompanies the second version runtime environment 100*b*, the user would be barred from doing so, since the class version has changed between the JVM versions. In such case, an exception would be raised, such as:

```
java.io.InvalidClassException: A; local class incompatible: stream
classdesc serialVersionUID = -5467795090068647408, local class
serialVersionUID = 1081892073854801359
```

In accordance with one embodiment, "a.txt" 110 may be loaded and an object of type "A" created using an auxiliary class loader 108. In one embodiment, the first version of class A 102*a* is added to the classpath of the auxiliary class loader 108, such that the auxiliary class loader 108 can load first version class A 102*a* without a version conflict. There will not be a version conflict because the primary class loader of the second version runtime environment 100*b*, second version class loader 106*b*, does not see and therefore does not load the first version Class A 102*a*. The data is extracted from Class A 102*a* or converted to an intermediary object 120, which may be a string, properties or other types of objects to represent the data are contemplated. In one embodiment, the data may be returned to a user or caller (not shown) that invoked loading of "a.txt" 110.

Figure 2A:
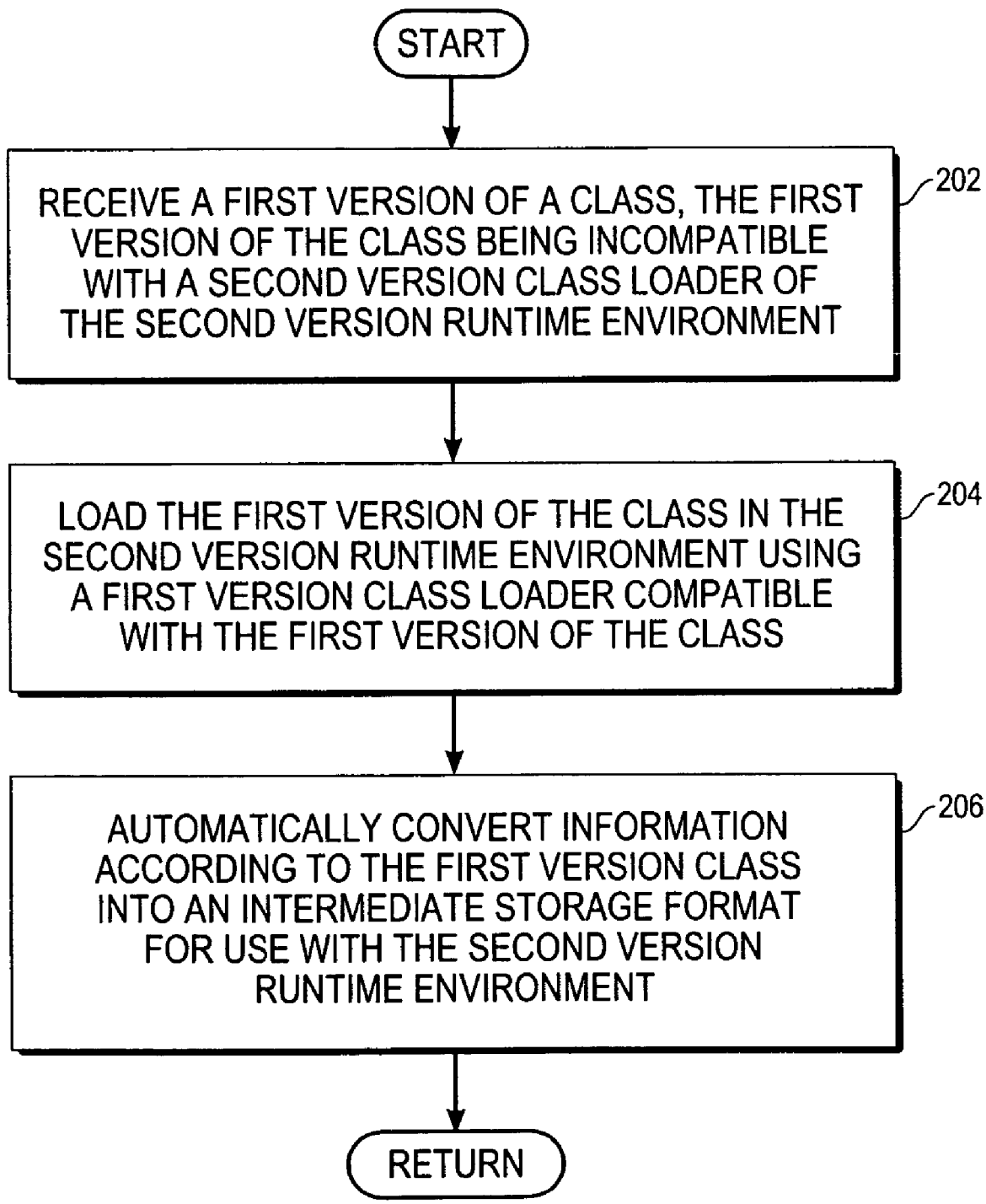
FIG. 2A is an operational flow diagram illustrating a high level overview of loading a first version of a class into a second version runtime environment running a second version of the class in one embodiment of the present invention.

An operational flow diagram of a method for loading a first version of a class into a second version runtime environment running a second version of the class, which provides a high level overview of one embodiment of the present invention, is shown in FIG. 2A. In one embodiment, a first version of a class is received (block 202). The first version of the class is incompatible with a second version class loader of the second version runtime environment. The first version of the class is loaded in the second version runtime environment using a first version class loader (i.e., auxiliary class loader 108 in FIG. 1) compatible with the first version of the class (block 204). Information organized according to the first version class is automatically converted into an intermediate storage format (such as format 120 of FIG. 1) for use with the second version runtime environment (block 206).

Figure 2B:
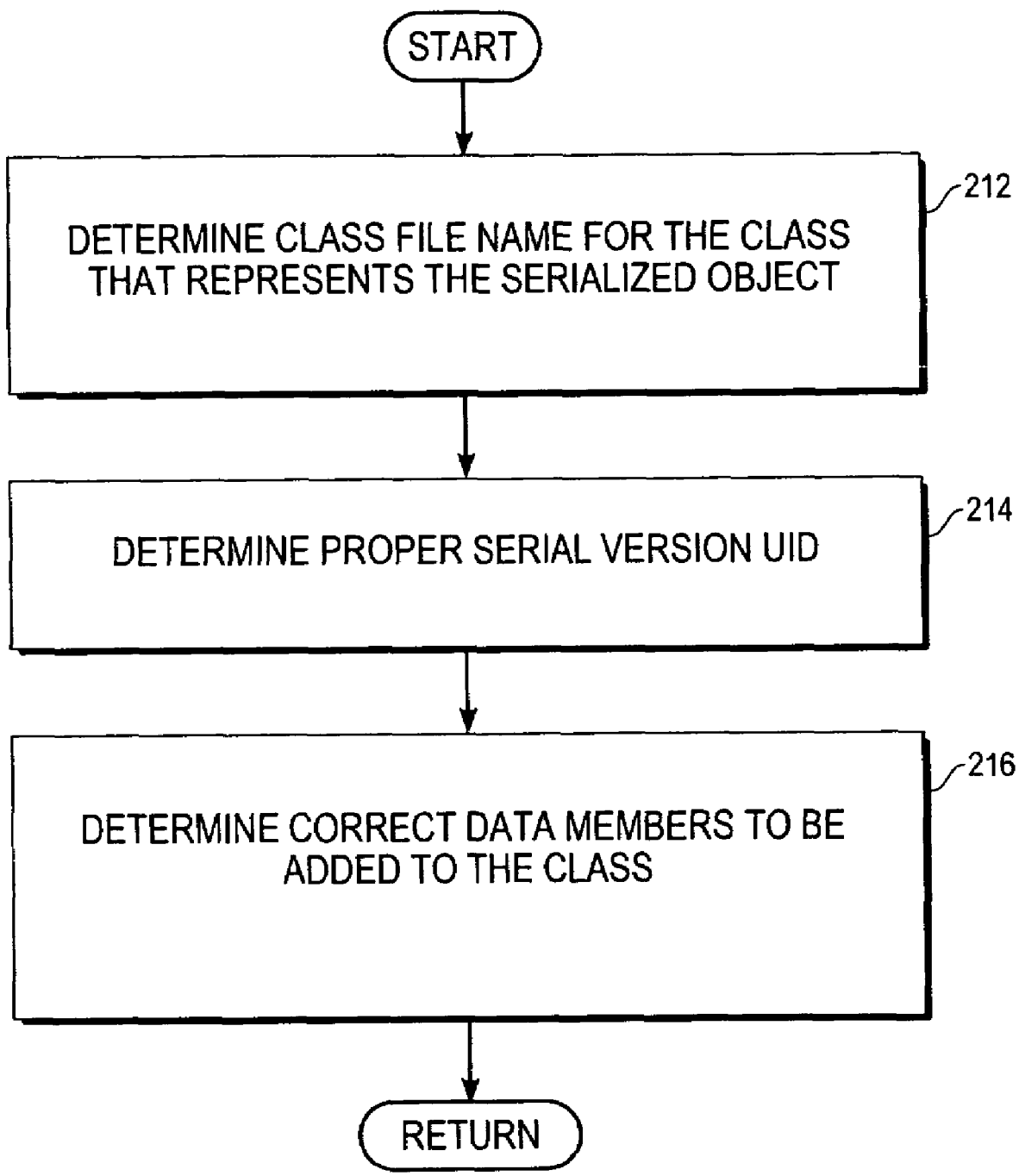
FIG. 2B is an operational flow diagram illustrating a high level overview of class loader processing in one embodiment of the present invention.

FIG. 2B is an operational flow diagram that illustrates class loader processing in one embodiment of the present invention. The class file name for the class that represents the serialized object is determined (block 212). In one embodiment, the class file name can be derived by attempting to load the serialized object into a JVM that does not contain a version of that class. The JVM will respond with a ClassNotFoundException that contains the name of the class in the serialized object file.

Once the classname is known it is possible to construct a class file. In a Java environment, in to load the serialized object, the serial version uid of the class must be the same as was represented by the original class used to serialize the object. Accordingly, in one embodiment, the proper serial version uid is determined (block 214). In one embodiment, the serial version uid can be determined by creating a class in java with the correct class name (as determined in block 212) but with no serial version uid specified. Then, with the newly created class on the classpath, an attempt to load the serialized object is made. The JVM will respond with an error message that reveals the expected serial version uid. This serial version uid can now be added to the class file.

Once the correct class name and serial version uid have been determined, it is possible to populate the class with data members. The correct data members to be added to the class are determined (block 216). In one embodiment, an auxiliary class loader 108 is used to determine data members for the class. In one embodiment, an ObjectInputStream supports a flag (as an argument to the constructor), which, if set, causes the loading process of the auxiliary class loader 108 to output a name and a type for the fields encountered in the input stream. The flag is set to true. Then, the new class (still without data members) is added to the classpath. The ObjectInputStream is used to load the serialized object. The load will fail but in the process the required fields will be displayed to the standard output (stdout). This information can be used to add the fields to the java class.

In accordance with one embodiment, "a.txt" 110 may be loaded and an object of type 'A' created by defining an auxiliary class loader 108, adding the first version of class A 102*a* to the auxiliary class loader 108 classpath such that the auxiliary class loader 108 can load the first version of class A 102*a* without a version conflict. There will not be a version conflict because the primary class loader of the second version runtime environment 100b (second version class loader 106b) does not load or see the first version of Class A 102a. The data is extracted from first version of Class A 102a or converted to a string (or properties or any other object that may be used to represent the data). The data may be returned to the main caller that loaded "a.txt" 110. Example code for performing loading and converting of a first version object in one embodiment follows:

```
/**
* Custom ObjectInputStream used to load and convert the old object.
*/
public class MyObjectInputStream extends ObjectInputStream
{
    // a flag indicating that we want to dump class descriptor data
    private boolean dumpClasses;
    // A special classloader which loads the compatibility versions of all the
    // classes appearing in the input stream.
    private ClassLoader classLoader = null;
    public MyObjectInputStream(InputStream in,
            ClassLoader classLoader,
            boolean dumpClasses)
        throws IOException   {
        super(in);
        this.classLoader = classLoader;
        this.dumpClasses = dumpClasses;
            // The following enables the method resolveObject, which allows us to convert
            // the loaded Foo class to a Map representation to return to the
            caller enableResolveObject(true);
    }
    // Derived from our superclass, this method allows us to load the compatibility
    // version of the problem class using our special class loader context. In this
    // way we can successfully load the object data in method resolveObject
    // (see below).
    //
    // Note: this classloader is also be used to load any referenced classes. In this
    // simple example that is not important but could be important in a more complex case.
    //
    protected Class resolveClass(ObjectStreamClass v)
            throws IOException, ClassNotFoundException   {
        Class cl = null;
        try { cl = classLoader.loadClass(v.getName( )); }
        catch (Exception e) {
            e.printStackTrace( );
        }
        return cl;
    }
    // Derived from our superclass, this method replaces the loaded Foo class with a
    // Map representation.
    //
    protected Object resolveObject(Object obj) throws IOException   {
        try {
            // skip all objects except the one we are converting
            if (!(obj instanceof Foo))
                return obj;
            // cast the loaded object to the stub version of our class
            Foo data = (Foo) obj;
            // extract the data and insert into our intermediate form
            HashMap map = new HashMap( );
            map.put("i",data.getInt( ));
            // return the intermediate form to the caller for conversion to the new
            // class format
            return map;
        } catch (Exception e)   {
            //e.printStackTrace( ); ignore
        }
        return obj;
    }
    // Derived from our superclass, this method allows us to look at the
    // class descriptors as they appears in the input stream data. During development the
    // class descriptor info can be used in determining the content of the
    // compatibility classes.
    //
    // By default this method is a noop. But if dumpClasses is set to true
    // when the contructor of this class is called, then
    // this method prints the contents of each class descriptor as it is loaded
    // from the stream.
    //
    // While initially used to develop the compatibility (stub classes) this is
    // included in the jar because it might prove usful in debugging
    // should a problem arise in loading a specific object in the future.
    protected ObjectStreamClass readClassDescriptor( )
            throws IOException, ClassNotFoundException
    {
        ObjectStreamClass d = super.readClassDescriptor( );
        // the Util class does the actual reporting
        if (dumpClasses) Util.dumpClassFields (d);
        return d;
    }
}
```

In one embodiment, a utility class, Util, is also loaded by auxiliary class loader 108. The utility class reads a.txt and produces an object of first version of Class A 102a. Example code for performing reading a file, such as a.txt, and preparing a class in one embodiment follows:

```
/**
* A utility class which, in conjuction with a custom ObjectInoutStream,
* can be used to analyse a serialized object in order to construct a
* minimal version of the class for conversion purposes.
*/
class Util {
    // static class access
    private Util ( ) {
    }
    // A helper method used to print out the class descriptors as they appear in
    // the input stream.
    static void dumpClassFields(ObjectStreamClass d)   {
        // no need to print out array class descriptors
        if (Array.class.isAssignableFrom(d.getClass( ))) return;
        System.out.println ("");
        System.out.println ("Fields of " + d.getName( ));
        ObjectStreamField[ ] mbiFields = d.getFields( );
        for (int i = 0; i < mbiFields.length; i++) {
            ObjectStreamField mbiField = mbiFields[i];
            System.out.println(" " + getType(mbiField) + " " + mbiField.getName( ));
        }
    }
    // A helper used by dumpClassFields to get a printable String which
    // represents the type of a field in the class description. This
    // method converts the internal type code (a char) to a String.
    static private String getType(ObjectStreamField osf)   {
        char tc = osf.getTypeCode( );
        String ts = osf.getTypeString( );
        switch (tc) {
            case ('I'): return "int";
            case ('Z'): return "boolean";
            case ('L'): return ts.substring(1,ts.length( ) -1);
            case ('['): return ts.substring(2,ts.length( ) -1) +" [ ]";
            case ('J'): return "long";
            case ('B'): return "byte";
            case ('C'): return "char";
            case ('D'): return "double";
            case ('F'): return "float";
            case ('S'): return "short";
            default: return "UNKNOWN";
        }
    }
}
```

The foregoing processing can provide a class that matches the one expected by the serialized object. This class can be used to load the serialized object into a runtime environment, such as the java runtime environment, and operate upon the serialized object's contents. One example of a first version class to which the foregoing embodiment may be applied follows:

```
public class Foo implements Serializable {
   final static long serialVersionUID = -6840145729716913324L;
      String __att__ = null;
      String __att = null;
      Int __i = 200;
      Int __i__ = 300;
   }
```

An example of a second version class corresponding to the first version class above follows:

```
public class Bar extends Foo {
   String attr1 = null;
   int i = 100;
   public static void main(String[ ] args) {
     if (args.length == 1) {
       String persistFileName = args[0];
       try {
         Foo __foo = new Foo( );
         FileOutputStream fos = new FileOutputStream(persistFileName,
         false);
         ObjectOutputStream oos = new ObjectOutputStream(fos);
         oos.writeObject(__foo);
         oos.flush( );
         oos.close( );
       } catch (Exception wx) {
         wx.printStackTrace( );
       }
     } else {
       try {
         String fileVersionName = args[0];
         FileInputStream fis = new FileInputStream(fileVersionName);
         ObjectInputStream ois = new ObjectInputStream(fis);
         // ois = new MyObjectInputStream(fis);
         Object obj = ois.readObject( );
         ois.close( )
         fis.close( );           }
         catch (Exception x) {
           x.printStackTrace( );
         }
       }
   }
   public static class MyObjectInputStream extends ObjectInputStream {
     public MyObjectInputStream(FileInputStream fis) throws
     IOException {
       super(fis);
     }
     protected Object resolveObject(Object obj) throws IOException {
       System.out.println("hello");
       return super.resolveObject(obj);
     }
   }
}
```

In one embodiment, the root serialized object could be a complex structure of referenced opaque objects. In that case the steps described above with reference to FIGS. 2A-2B can be repeated until the entire object/class structure is known.

In other aspects, the invention encompasses in some embodiments, computer apparatus, computing systems and machine-readable media configured to carry out the foregoing methods.

Figure 3:
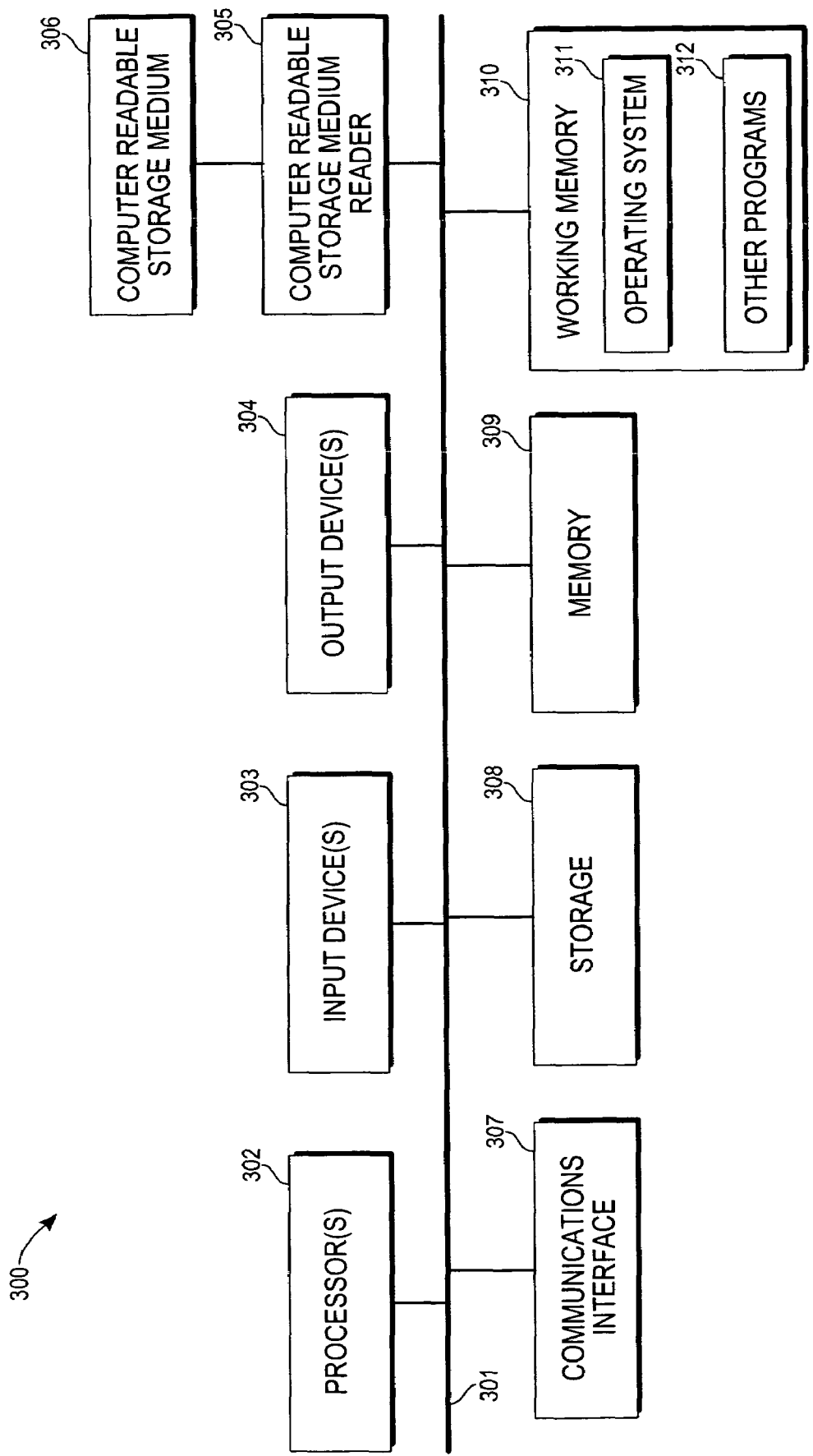
FIG. 3 is a hardware block diagram of an example computer system, which may be used to embody one or more components of an embodiment of the present invention.

FIG. 3 illustrates an exemplary processing system 300, that can comprise one or more of the elements of FIG. 1 or the remaining figures. Turning now to FIG. 3, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows, WindowsCE, Mac, Linux, Unix or Palm OS variants, a cell phone OS, a proprietary OS, Symbian, and so on). Various programming languages or other tools can also be utilized, such as those compatible with C variants (e.g., C++, C#), the Java 2 Platform, Enterprise Edition ("J2EE") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Embodiments can enable loading a first version (i.e., older version) classes into a runtime environment, such as a JVM, running a second version (i.e., newer version) of the class. Select embodiments can enable loading arbitrary opaque serialized java objects into user java code. Accordingly, a user having a serialized java object, who has never seen the class definition for that object and has no access to such class definition, may use the approach according to an embodiment to construct a java class that enables the user to read the object into a JVM.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing a mechanism to load first version classes into a runtime environment running a second version of the class as discussed herein.

The invention claimed is:

1. A method for loading a first version of a class into a second version of a runtime environment running a second version of the class, the method comprising the computer implemented steps of:
    instantiating an object in a first version of a runtime environment wherein the object is an instance of a first version of a class loaded in a first version of a class loader;
    serializing the object to create a serialized object and storing the serialized object on a storage medium;
    allowing the first version of the class to be modified to create a second version of the class, wherein the second version of the class has a different definition from the first version of the class;
    loading a second version of the class in a second version of a class loader for a second version of the runtime environment;
    receiving the serialized object in the second version of the runtime environment, wherein the first version of the class is incompatible with the second version of the class loader for the second version of the runtime environment;
    constructing a class file with a class file name for the class that represents the serialized object and a serial version identifier for the first version of the class;
    loading, into the second version of the runtime environment, the serialized object using the class file as constructed in an auxiliary class loader compatible with the first version of the class; and
    converting information from the serialized object into an intermediate storage format for use with the second version of the runtime environment.

2. The method of claim 1, wherein
    the first version of the class is compatible with a first version of the runtime environment, wherein modifying the first version of the class to yield the second version of the class renders the first version of the class incompatible with the second version of the class loader of the second version of the runtime environment.

3. The method of claim 2, wherein a first party controlling the second version of the class is blocked from changing the first version of the class by a second party's control over the first version of the class.

4. The method of claim 3, wherein the first party creates the second version of the class by modifying the first version of the class prior to relinquishing control over the first version of the class to the second party.

5. The method of claim 3, wherein the second party creates the second version of the class by modifying the first version of the class after receiving control over the first version of the class from the first party.

6. The method of claim 2,
    wherein the first version of the class is a serializable java class lacking a SerialVersion ID; thereby causing the first version of the class to be barred from being loaded in the second version runtime environment by the second version class loader.

7. The method of claim 1, futher comprising:
    defining the auxiliary class loader; and
    adding the first version class to a classpath of the auxiliary class loader.

8. The method of claim 1, wherein converting information according to the first version of the class into an intermediate storage format further comprises:

converting information according to the first version class into at least one of a string, an XML object, a hashmap and a Java object.

9. The method of claim 1, further comprising:
providing the intermediate storage format data to a process or user requesting loading of the first version of the class.

10. The method of claim 1, further comprising:
loading a second version of the class using a second version of the class loader, the second version of the class loader being incompatible with the first version of the class.

11. The method of claim 1, wherein the second version of the runtime environment comprises a modified version of the first version of the runtime environment.

12. The method of claim 1, wherein selecting an intermediate storage format for the information for use with the second version runtime environment comprises:
selecting a hashmap as intermediate storage format for the information if the first version class comprises name/value pairings;
selecting an eXtended Markup Language (XML) object as intermediate storage format for the information if the first version class comprises metadata; and
selecting a string object as intermediate storage format for the information if the first version class comprises a long string data.

13. A computer-readable storage medium storing one or more sequences of instructions for loading a first version of a class into a second version of a runtime environment running a second version of the class, which instructions, when executed by one or more processors, cause the one or more processors to carry out the steps of:
instantiating an object in a first version of a runtime environment wherein the object is an instance of a first version of a class loaded in a first version of a class loader;
serializing the object to create a serialized object and storing the serialized object on a storage medium;
allowing the first version of the class to be modified to create a second version of the class, wherein the second version of the class has a different definition from the first version of the class;
loading a second version of the class in a second version of a class loader for a second version of the runtime environment;
receiving the serialized object in the second version of the runtime environment, wherein the first version of the class is incompatible with the second version of the class loader for the second version of the runtime environment;
constructing a class file with a class file name for the class that represents the serialized object and a serial version identifier for the first version of the class;
loading, into the second version of the runtime environment, the serialized object using the class file as constructed in an auxiliary class loader compatible with the first version of the class; and
converting information from the serialized object into an intermediate storage format for use with the second version of the runtime environment.

14. The computer-readable storage medium as recited in claim 13, wherein
the first version of the class being compatible with a first version runtime environment, wherein modification to the first version of the class to yield the second version of the class has rendered the first version class incompatible with the second version class loader of the second version runtime environment.

15. The computer-readable storage medium as recited in claim 14, wherein a first party controlling the second version of the class is blocked from changing the first version of the class by a second party'control over the first version of the class.

16. The computer-readable storage medium as recited in claim 15, wherein the first party creates the second version of the class by modifying the first version of the class prior to relinquishing control over the first version of the class to the second party.

17. The computer-readable storage medium as recited in claim 15, wherein the second party creates the second version of the class by modifying the first version of the class after receiving control over the first version of the class from the first party.

18. The computer-readable storage medium as recited in claim 14,
wherein the first version of the class is a serailizable java class lacking a Serial Version ID; thereby causing the first version of the class to be barred from being loaded in the second version runtime environment by the second version class loader.

19. The computer-readable storage medium as recited in claim 13, wherein the instructions further comprise instructions for carrying out the steps of:
defining the first version class loader; and
adding the first version class to a classpath of the first version class loader.

20. The computer-readable storage medium as recited in claim 13, wherein the instructions for carrying out the step of converting information according to the first version of the class into an intermediate storage format further comprise instructions for carrying out the steps of:
converting information according to the first version of the class into at least one of a string, an X M L object, a hashmap and a Java object.

21. The computer-readable storage medium as recited in claim 13, further comprising instructions which, when executed by the one or more processors, cause the one or more processors to carry out the steps of:
providing the intermediate storage format data to a process or user requesting loading of the first version of the class.

22. The computer-readable storage medium as recited in claim 13, further comprising instructions which, when executed by the one or more processors, cause the one or more processors to carry out the steps of:
loading a second version of the class using a second version class loader, the second version class loader being incompatible with the first version class.

23. The computer-readable storage medium as recited in claim 13, wherein the second version of the runtime environment comprises a modified version of the first version of the runtime environment.

24. The computer-readable storage medium as recited in claim 13, wherein the instructions for selecting intermediate storage format for the information for use with the second version runtime environment comprise instructions for carrying out a least one of the steps of:
selecting a hashmap as intermediate storage format for the information if the first version class comprises name/value pairings;
selecting an eXtended Markup Language (XML) object as intermediate storage format for the information if the first version class comprises metadata; and
selecting a string object as intermediate storage format for the information if the first version class comprises a long string data.

25. The computer-implemented method of claim 1, wherein the step of constructing a class file with a class file name for the class that represents the serialized object and a serial version identifier for the first version of the class comprises:
- loading the serialized object into a first virtual machine that does not contain a version of the serializable class;
- receiving a first message that contains the name of the serializable class;
- constructing a first class file with the name of the serializable class;
- loading the first class file in a second virtual machine that contains the second version of the serializable class;
- receiving a second message listing an expected serial version identifier;
- constructing a second class file with the name of the serializable class and the expected serial version identifier;
- loading the second class file in the second virtual machine;
- receiving a third message listing required data members; and
- constructing a third class file with the name of the serializable class, the expected serial version identifier, and the required data members.

26. A system to load data from a serialized object of a first version of a class in a run time environment including a second version of the class, comprising:
- a processor;
- a serialized object stored on a storage medium, wherein the serialized object is an instance of first version of a class, wherein the first version of the class does not have a serial version identifier;
- a run time environment that includes:
  - one or more virtual machines;
  - an instance of a second version of the class;
  - a primary class loader for loading the second version of a class;
  - an auxiliary class loader for loading the first version of the class;
  - computer code for constructing a class file for the first version of the class which includes a file name, serial version identifier, and data members;
  - computer code for loading the class file as constructed in the auxiliary class loader, and
  - computer code for extracting information from the serialized object into an intermediate storage format, for use with the instance of the second version of the class.

27. The system of claim 26, wherein the auxiliary class loader constructs a class file for the previous version of the class with file name, serial version identifier, and data members by performing steps comprising:
- loading the serialized object into a first virtual machine that does not contain a version of the serializable class;
- receiving a first message that contains the name of the serializable class;
- constructing a first class file with the name of the serializable class;
- loading the first class file with the name of the serializable class in a second virtual machine that contains the second version of the serializable class;
- receiving a second message listing an expected serial version identifier;
- constructing a second class file with the name of the serializable class and the expected serial version identifier;
- loading the second class file with die name of the serializable class and the expected serial version identifier in the second virtual machine;
- receiving a third message listing required data members; and
- constructing a third class file with the name of the serializable class, the expected serial version identifier, and the required data members.

28. The system of claim 26, wherein the intermediate storage format for use within an instance of the current version of the class in the runtime environment is an eXtended Markup Language (XML) object if information in the previous version class comprises metadata.

29. The system of claim 26, wherein the intermediate storage format for use with an instance of the current version of the class in the runtime environment is a hashmap if information in the previous version class comprises name/value pairings.

* * * * *

UNITED STATES PATENT AND TRADEMARK OFFICE
CERTIFICATE OF CORRECTION

| | | |
|---|---|---|
| PATENT NO. | : 7,543,002 B2 | Page 1 of 2 |
| APPLICATION NO. | : 11/037482 | |
| DATED | : June 2, 2009 | |
| INVENTOR(S) | : Ghattu et al. | |

It is certified that error appears in the above-identified patent and that said Letters Patent is hereby corrected as shown below:

On Title page, in Item (57), in "Abstract", line 4, delete "(JYM)." and insert -- (JVM). --, therefor.

On sheet 1 of 4, in Figure 1, Ref. Numeral 108, line 1, delete "AUXILLARY" and insert -- AUXILIARY --, therefor.

In column 6, line 7, delete "contructor" and insert -- constructor --, therefor.

In column 6, line 11, delete "usful" and insert -- useful --, therefor.

In column 6, line 31, delete "conjuction" and insert -- conjunction --, therefor.

In column 10, line 6-7, in claim 1, delete "computer implemented" and insert -- computer-implemented --, therefor.

In column 10, line 9, in claim 1, after "environment" insert -- , --.

In column 10, line 38, in claim 2, delete "yieid" and insert -- yield --, therefor.

In column 10, line 61, in claim 7, delete "futher" and insert -- further --, therefor.

In column 11, line 1, in claim 8, delete "version" and insert -- version of the --, therefor.

In column 11, line 33, in claim 13, after "environment" insert -- , --.

In column 12, line 4, in claim 15, delete "party'control" and insert -- party's control --, therefor.

In column 12, line 18, in claim 18, delete "serailizable" and insert -- serializable --, therefor.

In column 12, line 35, in claim 20, delete "X M L" and insert -- XML --, therefor.

In column 12, line 55, in claim 24, after "selecting" insert -- an --.

Signed and Sealed this

Fifteenth Day of June, 2010

David J. Kappos
*Director of the United States Patent and Trademark Office*

CERTIFICATE OF CORRECTION (continued)

In column 12, line 58, in claim 24, delete "a" and insert -- at --, therefor.

In column 13, line 25, in claim 26, delete "run time" and insert -- runtime --, therefor.

In column 13, line 29, in claim 26, delete "of" and insert -- of a --, therefor.

In column 13, line 32, in claim 26, delete "run time" and insert -- runtime --, therefor.

In column 14, line 2, in claim 26, delete "loader," and insert -- loader; --, therefor.

In column 14, line 23, in claim 27, delete "die" and insert -- the --, therefor.

In column 14, line 32, in claim 28, delete "within" and insert -- with --, therefor.